(12) United States Patent
Satake et al.

(10) Patent No.: US 7,502,944 B2
(45) Date of Patent: Mar. 10, 2009

(54) JOB PROCESSING DEVICE AND DATA MANAGEMENT FOR THE DEVICE

(75) Inventors: Masanori Satake, Ebina (JP); Takanori Masui, Ebina (JP); Tatsuhiko Yokohama, Ebina (JP)

(73) Assignee: Fuji Xerox, Co., Ltd, Tokyo (JP)

( * ) Notice: Subject to any disclaimer, the term of this patent is extended or adjusted under 35 U.S.C. 154(b) by 751 days.

(21) Appl. No.: 10/653,217

(22) Filed: Sep. 3, 2003

(65) Prior Publication Data
US 2004/0193899 A1 Sep. 30, 2004

(30) Foreign Application Priority Data
Mar. 24, 2003 (JP) ............... 2003-081445

(51) Int. Cl.
*G06F 12/14* (2006.01)
(52) U.S. Cl. ..................................... 713/193; 358/1.16
(58) Field of Classification Search ................. 713/190, 713/193; 700/99–101; 380/51, 54, 55; 283/72; 358/1.14, 1.15, 1.16
See application file for complete search history.

(56) References Cited

U.S. PATENT DOCUMENTS

| 6,003,069 | A | * | 12/1999 | Cavill | 709/205 |
| 6,571,147 | B1 | * | 5/2003 | Kashihara | 700/100 |
| 6,665,641 | B1 | * | 12/2003 | Coorman et al. | 704/260 |
| 6,671,564 | B1 | * | 12/2003 | Johnson et al. | 700/19 |
| 6,862,583 | B1 | * | 3/2005 | Mazzagatte et al. | 705/64 |
| 6,952,780 | B2 | * | 10/2005 | Olsen et al. | 726/26 |
| 7,100,198 | B2 | * | 8/2006 | Kurishita et al. | 726/4 |
| 7,159,193 | B2 | * | 1/2007 | Wada | 715/838 |
| 2001/0056546 | A1 | * | 12/2001 | Ogilvie | 713/200 |
| 2002/0042880 | A1 | * | 4/2002 | Endoh | 713/182 |
| 2003/0041269 | A1 | * | 2/2003 | Kurishita et al. | 713/201 |
| 2003/0044009 | A1 | * | 3/2003 | Dathathraya | 380/55 |
| 2003/0099353 | A1 | * | 5/2003 | Goh et al. | 380/51 |
| 2003/0145218 | A1 | * | 7/2003 | Hutchison | 713/200 |
| 2004/0008842 | A1 | * | 1/2004 | Partelow et al. | 380/51 |

(Continued)

FOREIGN PATENT DOCUMENTS

EP 1 357 468 10/2003

(Continued)

OTHER PUBLICATIONS

Consice Explanation of Relevance for Non-English Language Information, Japanese Patent Publication No. 2004-336672.

(Continued)

*Primary Examiner*—Emmanuel L Moise
*Assistant Examiner*—Zachary A Davis
(74) *Attorney, Agent, or Firm*—Oliff & Berridge, PLC (57) ABSTRACT

A job device for increasing security of job data includes a CPU that encrypts job data while saving job data required in execution of a job. The CPU saves part of the data in RAM, and saves the remaining stored file in an HDD. When the job ends, part of the job data for the job in the RAM is deleted. Part of the job data is therefore completely eliminated as a result of this deletion, and it is not possible to know the complete job data even if the HDD is removed and checked.

13 Claims, 9 Drawing Sheets

U.S. PATENT DOCUMENTS

| | | |
|---|---|---|
| 2004/0012812 A1 | 1/2004 | Shimizu |
| 2005/0013643 A1 | 1/2005 | Fukano |
| 2005/0232031 A1 | 10/2005 | Fukano |
| 2006/0158518 A1 | 7/2006 | Sakai |

FOREIGN PATENT DOCUMENTS

| | | |
|---|---|---|
| JP | A 9-223061 | 8/1997 |
| JP | A 9-284572 | 10/1997 |
| JP | A 2002-259083 | 9/2002 |
| JP | A 2003-37719 | 2/2003 |
| JP | A 2003-335017 | 11/2003 |
| JP | A 2004-336672 | 11/2004 |
| KR | 1993-0008657 | 10/1994 |
| KR | 10-2004-0111185 | 12/2004 |
| KR | 10-2006-0004940 | 1/2006 |

OTHER PUBLICATIONS

Consice Explanation of Relevance for Non-English Language Information, Japanese Patent Publication No. 2002-259083.

Consice Explanation of Relevance for Non-English Language Information, Japanese Patent Publication No. 2003-335017.

* cited by examiner

JOB PROCESSING DEVICE AND DATA MANAGEMENT FOR THE DEVICE

BACKGROUND OF THE INVENTION

1. Field of the Invention

The present invention relates to a job processing device for executing prescribed jobs according to requests from users for copiers, printers, facsimiles or multi-purpose equipment etc., and particularly relates to technology for securely storing data stored in a job processing device.

2. Description of the Related Art

In recent years, digital copiers and multifunction peripherals loaded with large capacity storage devices such as hard discs have become common. Such large capacity storage devices can be used in applications such as storing original images temporarily in the case of making a plurality of copies of an original document or when carrying out dual-sided printing, or storing an original image read by a document reader in response to a scan request until a user has downloaded this original image over a network.

In recent years, with the background of increasing prevalence of networks and the accompanying misuse of information, there has been a tendency for the strength of information security management strength at enterprises to increase, bringing about the commencement of authentication systems such as ISMS (Information Security Management Systems), etc. Taking into consideration the risk of information disclosure due to extraction of a hard disc etc., regarding management of overall information security of an enterprise, it is not possible to ignore data left in large capacity storage devices for digital copiers or multifunction peripherals.

With regards to this problem, with the technology shown in Japanese Patent Laid-open Publication No. Hei. 9-223061, a secret document mode is provided at the copier, and when this mode is set, this image data is erased from the hard disc when this image data processing is complete.

With the technology shown in Japanese Patent Laid-open Publication No. Hei. 9-284572, image data stored in the hard disc is deleted when the copier is idle.

With the technology shown in Japanese Patent Laid-open Publication No. 2003-37719, whether image data for an interrupt job is deleted when an interrupt job is completed directly before returning to the processing before the interrupt, or is deleted after completion of the interrupted job, is decided according to the amount of data for this image data. Further, with this technology, image data on the hard disc may be deleted when a user does not operate the copier for more than a prescribed period of time, or when image data relating to this copying processing is deleted from the hard disc when a user gives an instruction to stop copying.

With deletion of the image data on the hard disc, simply deleting the image file from the file system is not sufficient as the actual data still remains on the hard disc. Therefore, in the related art, random data is written a plurality of times to the region for this actual data in cases up until the actual data is deleted from the hard disc.

Further, security can be improved by encrypting the image data and then storing the image data on the hard disc.

In the above related technology, it is not possible to read and write image data to the hard disc when image data is being deleted from the hard disc and it is therefore not possible to start a subsequent print process or image reading process during this time. For example, in the case of a color document having a large number of pages, after processing is carried out on this original document with a large volume of data, the time taken to delete the image data for the original document is long and a processing wait is therefore also considerable. With the technology of Japanese Patent Laid-open Publication No. 2003-37719, it is intended to reduce the influence of deletion processing by controlling the timing of carrying out deletion processing in accordance with interrupts and other conditions. However, there is no improvement with respect to the point that once deletion is started it is not possible to start other processing until the deletion is complete. Further, with the technology of Japanese Patent Laid-open Publication No. 2003-37719, there is the problem that actual data remains in its complete form on the hard disc until the time that the deletion process is executed.

SUMMARY OF THE INVENTION

As the present invention, there is provided a job processing device comprising a first storage device, a second storage device capable of having stored data erased at a faster speed than the first storage device, a storage controller for distributing and storing job data provided to execute a job between the first storage device and the second storage device, and a deletion controller for deleting job data stored allocated to the second storage device by the storage controller when a prescribed deletion condition is satisfied.

In a preferred embodiment of the present invention, volatile memory is used as the second storage device.

In a further preferred embodiment, an area that is part of a main storage device the job processing device is equipped with is taken to be the second storage unit.

In a still further preferred embodiment, the storage controller encrypts the job data and distributes and stores data resulting from this encryption between the first storage device and the second storage device.

In another preferred embodiment, the storage controller distributes and stores job data between the first storage device and the second storage device in accordance with a prescribed rule, and is further equipped with a rule manager for changing the prescribed rule.

Changes to the rules can be carried out according to, for example, the state of the job processing device. A "state" for the job processing device may be, for example, amount of free space or writing/reading speed of the second storage device, job processing device processing load, and presence or absence of a waiting job.

In a still further preferred embodiment, the job processing device is further equipped with a rule manager for changing the rule according to a job attribute. "Job attribute" may be degree of confidentiality given to the job, or type of document the job is for, etc.

DESCRIPTION OF THE PREFERRED EMBODIMENT

The following is a description based on the drawings of a preferred embodiment of the present invention. The following describes an example of the method of the present invention as applied to an image-forming device such as digital multifunction peripherals, etc. Namely, in the following, a description is given of a way of providing security protection for data received or generated in order to execute various types of jobs requested to an image forming device such as image data files generated by a document reader for copying or scanning, print instructions requested by a remote host, image data files developed as a result of such requests or received facsimile data, etc.

Figure 1:
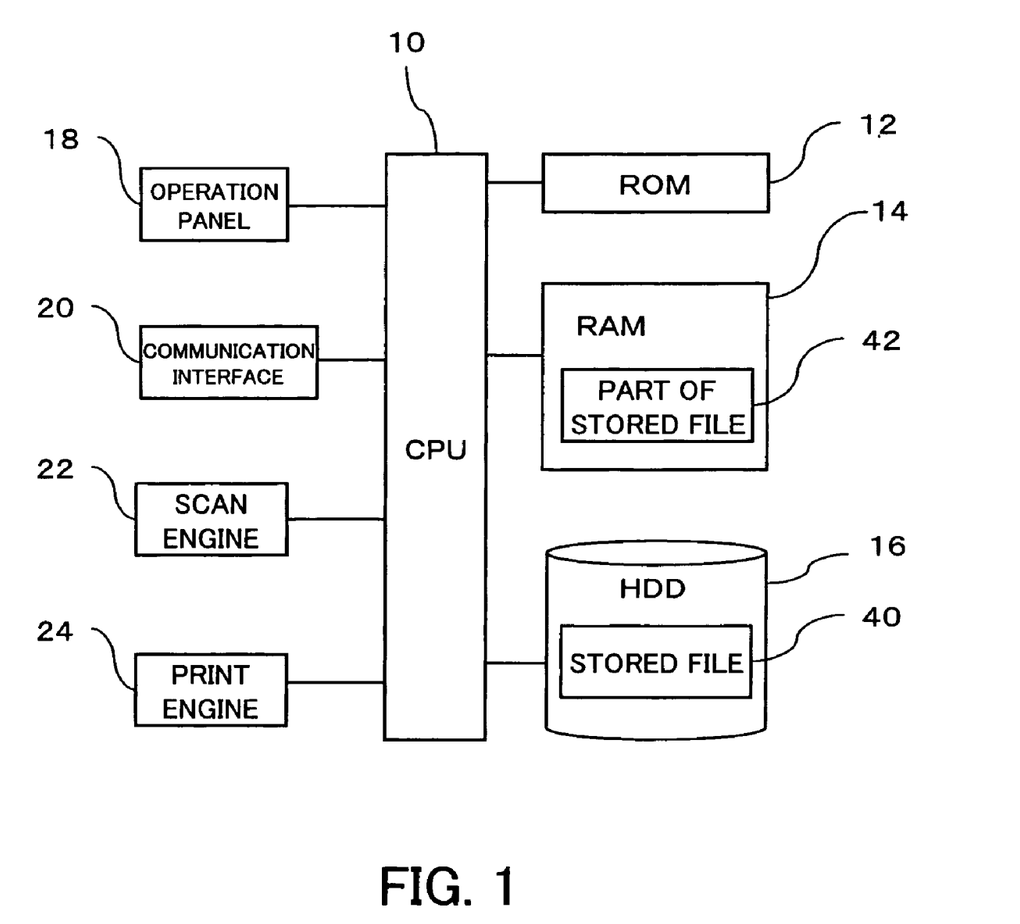
FIG. 1 is a view showing the essential parts of a hardware configuration for an image-forming device of the present invention.

First, referring to FIG. 1, a description is given of a hardware configuration for an image processing device of this embodiment. FIG. 1 is a view showing structural elements essential to the description of the control of this embodiment, with other structural elements being omitted from the drawing.

This image-forming device is a device such as a digital copier or digital multifunction peripheral that handles images obtained by optically reading an original document as digital data.

At this device, digital information such as a control program for controlling operations of the image-forming device is stored in a ROM (Read Only Memory) 12. A CPU (Central Processing Unit) 10 executes control of each part of the image-forming device by implementing the control program within the ROM 12. Programs describing each of the procedures of storing, reading and deleting files described in the following are stored in the ROM 12.

A RAM (Random Access Memory) 14 is the main storage device of this image-forming device and is used as work memory when executing the control program. The RAM 14 can be used, for example, as a page buffer for storing a one page portion of image data for supplying to the print engine 24.

A HDD (Hard Disc Drive) 16 is an auxiliary storage device for storing various kinds of data. For example, the image-forming device saves job data that is received or that is generated in the HDD 16 for various kinds of job that are requested. Original document image data read by the scan engine 22 for copying, print instruction data for security print processing (where user authentication is successful and processing to perform printing begins) requested by a remote host, image data obtained by developing this print instruction data, and image data read in by the scan engine 22 according to a scan instruction may be taken as examples of this kind of image data. This kind of job data file is deleted from the file system upon completion of the job. However, the problem that has existed from the related art, where if the file is simply deleted from the file system, actual data for this file remains on the HDD, still exists, but this embodiment provides a new way of resolving this problem.

An operation panel 18 is user interface means for displaying a user interface for the image-forming device and for receiving input for various instructions from the user. The operation panel 18 is typically equipped with mechanical operation buttons such as a copy start button etc. and a liquid crystal touch panel. The liquid crystal touch panel displays a GUI (Graphical User Interface) screen generated by the control program executed by the CPU 10, detects positions touched by the user on this display and passes these over to the control program. The control program then interprets this user input from the touch position information.

A communication interface 20 is a device for controlling data communication with a network such as a local area network etc. A print instruction etc. from the remote host is inputted to the image-forming device via the communication interface 20.

A scan engine 22 is a device for providing a scan function for creating electronic image data by optically reading an original document. An original document installed at an Automatic Document Feeder (omitted from the drawings) is sent to the scan engine one page at a time by the ADF function and is optically read.

The print engine 24 is a device for providing a print function for forming (printing) images on paper using image data provided under the control of the CPU 10.

With this image-forming device, in this embodiment, as a measure for improving security of stored job data files, job data files stored in a HDD in the prior art are stored distributed between HDD 16 and RAM 14. In other words, one job data file is stored split between a file 40 stored in the HDD 16 and a part 42 of the file stored in the RAM 14. It is possible to delete the part 42 of the file stored in RAM 14 when the job data file is deleted. Deletion of the data in the RAM 14 can be carried out at high speed. When data 42 in the RAM 14 is deleted, it is not possible to decrypt the original job data file using just the stored file 40 remaining in the HDD 16 and the secrecy of the job data can therefore be protected. In particular, if a configuration is adopted where a job data file is encrypted and then stored in a distributed manner between the HDD 16 and the RAM 14, the stored file 40 remaining on the HDD 16 is an encrypted job data file with a part missing. This makes decryption extremely difficult and ensures that security is kept high.

Figure 2:
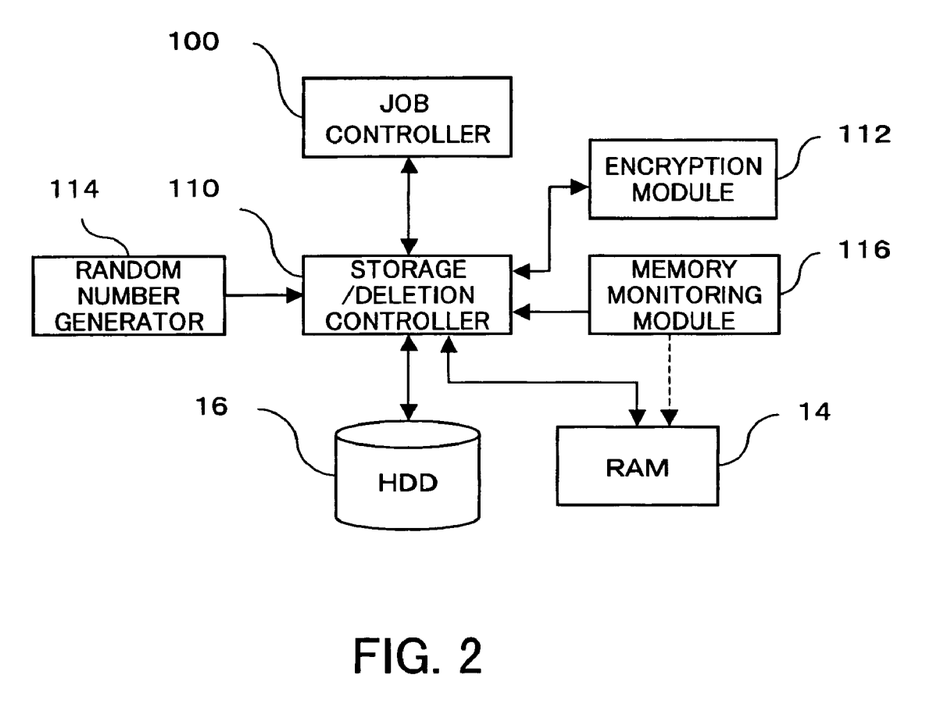
FIG. 2 is a functional block view showing a mechanism for storing, reading and deleting job data files of the image-forming device of the present invention.

FIG. 2 is a functional block view showing a mechanism for storing, reading and deleting job data files for this image-forming device. This mechanism is implemented by executing a program stored in the ROM 12 or HDD 16 using the CPU 10.

In this configuration, the job controller 100 receives job requests inputted from the operation panel 18 or the communication interface 20 and exerts control to execute job processing corresponding to these requests. Image-forming processing, various image processing, character recognition processing, and processing for sending to other devices etc. can be given as job execution. Receipt of interrupt jobs for jobs being executed and control of saving and returning of jobs accompanying these interrupts is carried out by the job controller 100. When the job to be executed is a job for which the temporary storage of data is necessary, the job controller 100 makes a request to the storage/deletion controller 110 with regards to this storage. Jobs requiring temporary storage of job data may be, for example, jobs where a plurality of copies are made of an original document, security print jobs, or jobs where a read image is temporarily stored in a secured private storage area in the HDD 16. In the case of a plurality of copies, the job is complete at the time when print output for the number of copies is finished. In the case of a security print, the job is complete when the user of the image-forming device is authenticated and the print output ends. With processing for saving a scanned image in a private storage area, the job is complete when a remote host finishes downloading data in the private storage area.

Further, the job controller 100 reads out job data saved temporarily at the time of use in order to execute a job and issues a request to read the job data to the storage/deletion controller 110.

The storage/deletion controller 110 is a module for carrying out processing for storing and reading job data files. When there is a request to store a job data file from the job controller 100, the storage/deletion controller 110 performs distributed storage of the job data file across the RAM 14 and HDD 16 in accordance with prescribed distribution rules (or procedures). Moreover, when there is a job data file read request from the job controller 100, the storage/deletion controller 110 reads the storage-distributed data from the RAM 14 and the HDD 16, reconstructs the original job data file through integration based on the distribution rules, and provides the original job file to the job controller 100.

The encryption module 112 encrypts data stored in the RAM 14 and the HDD 16 by the storage/deletion controller 110 in accordance with a prescribed encryption algorithm and decrypts data read out from the RAM 14 and the HDD 16.

A random number generator 114 is a module for generating random numbers for the processing of distributed storage by the storage/deletion controller 110 to the RAM 14 and the HDD 16.

A memory monitoring module 116 is a module for monitoring the amount of space in the RAM 14. Information regarding storage space obtained through observation is utilized in obtaining the extent to which the storage/deletion controller 110 distributed job data between the RAM 14 and the HDD 16.

Figure 3:
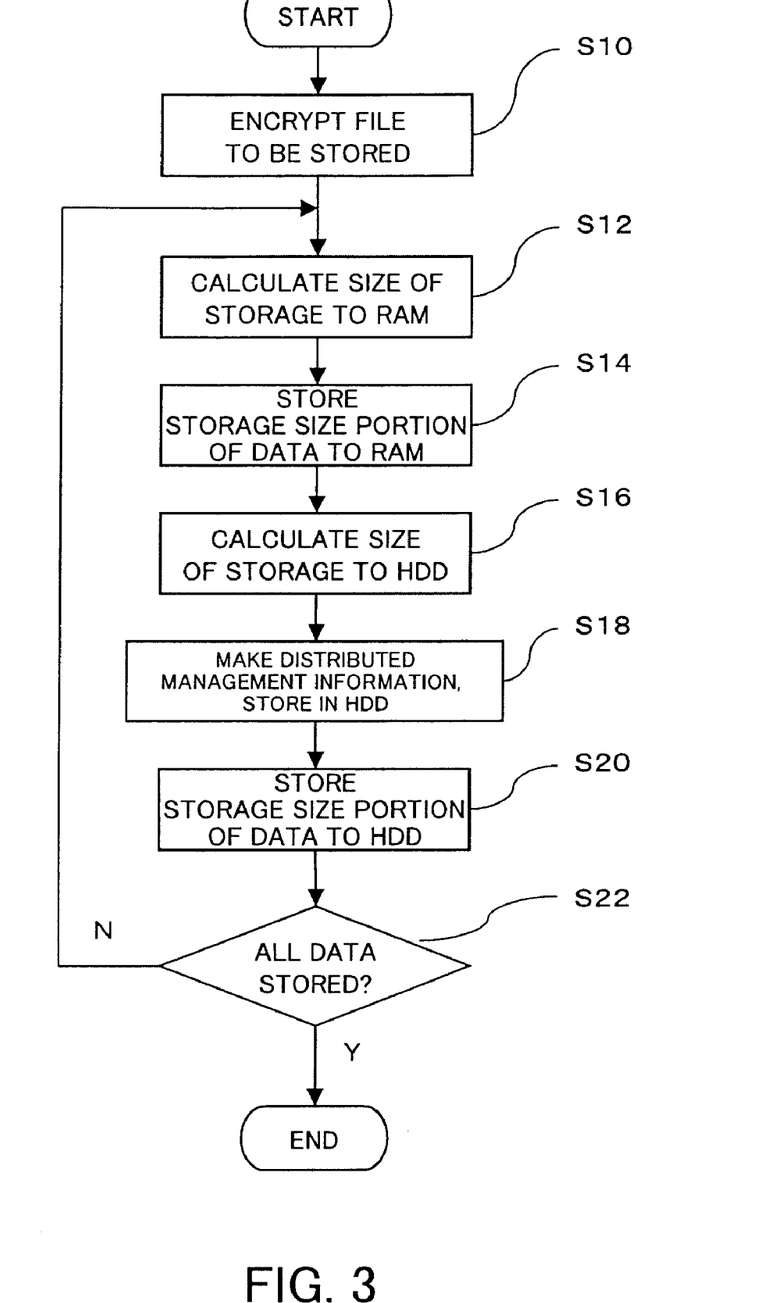
FIG. 3 is a flowchart showing an example of a processing procedure for storing a job data file using a storage/deletion controller.

A description is now given with reference to FIG. 3 of processing during storage of a job data file by the storage/deletion controller 110.

When a request to store a job data file is received from the job controller 100, the storage/deletion controller 110 first encrypts this file using the encryption module 112 (S10).

Next, the storage/deletion controller 110 calculates the size of that part of the data of the encrypted job data that is stored in the RAM 14 (S12). This calculation calculates storage size using space in the RAM 14 obtained by the memory monitoring module 116 and a random number generated by the random number generator 114. The storage size may be made larger when there is more free space in the RAM 14 and adjustments are made using random numbers so that the relationship between space and storage size does not become fixed. This may be, for example, processing where a prescribed proportion of the free space in the RAM 14 is decided upon as a storage size reference value, with a storage size then being obtained by subjecting this reference value to adjustment using normal distribution random numbers generated by the random number generator 114. Insufficient work memory during storage processing can therefore be avoided by considering free space in the RAM 14 when deciding storage size. Further, the rules for distribution can be made more difficult to understand by changing the storage size using this random number and improvement in security can be anticipated.

When calculation of the storage size at the RAM 14 is complete, the storage/deletion controller 110 stores an amount of the encrypted job data (in the following, this is simply referred to as "job data") of this storage size from the top of the data in the RAM 14 (S14). It is also possible to decide data storage position (ex. start address) randomly or decide according to prescribed rules (storing at the top of the free space, etc.).

After storing in the RAM 14, the storage/deletion controller 110 calculates a size for storage to the HDD 16(S16). This storage size calculation can be carried out in the same way as for the calculation of storage size to the RAM 14.

When the size for storage to the HDD 16 can be calculated, the storage/deletion controller 110 makes distribution management information and writes this information to the HDD 16 (S18) and writes a storage-size portion of data to the HDD 16 from the top of the portion of job data yet to be stored (S20). In this process, the operating system of the image-forming device reserves a file region for storing the job data in the HDD 16 and writes the distribution management information and the job data to this region.

The process of steps S12 to S20 above is repeated until no un-stored portions of the job data remain (S22). As a result, the job data is stored in a distributed manner between the RAM 14 and the HDD 16. In this way, in the processing in FIG. 3, the job data is stored alternately a little at a time in the RAM 14 and the HDD 16.

Figure 4:
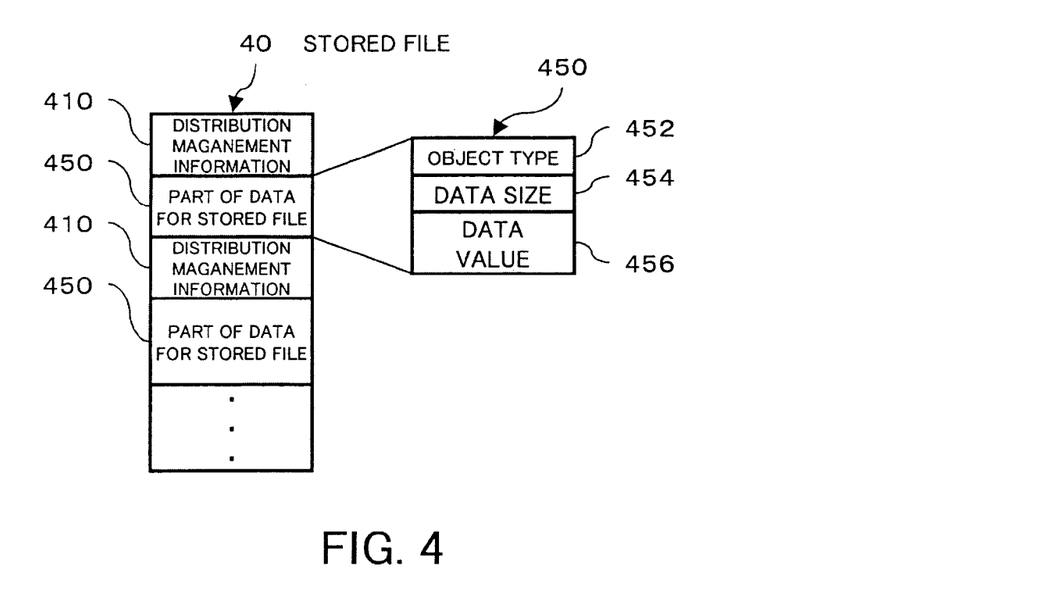
FIG. 4 is a view showing an example data configuration for a file stored in a HDD.

An example of a data structure for the stored file 40 generated within the HDD 16 as a result of the processing of FIG. 3 is shown in FIG. 4. As shown in the drawings, the stored file 40 is configured by repeating distribution management information 410 and file data part 450 of the stored file. The distribution management information 410 is information for accessing data stored in the RAM 14 and the data part 450 is a portion of the job data. This data part 450 can be described using a data structure conforming to, for example, BER encoding rules of ASN. 1. In this case, the data part 450 is comprised of information for an object type 452 indicating the type of data, a size 454 for this data, and a value 456 for this data, lined up in that order. An item of distribution management information 410 and a following data part 450 are made each time the process from step S12 to step S20 of FIG. 3 is carried out.

Figure 5:
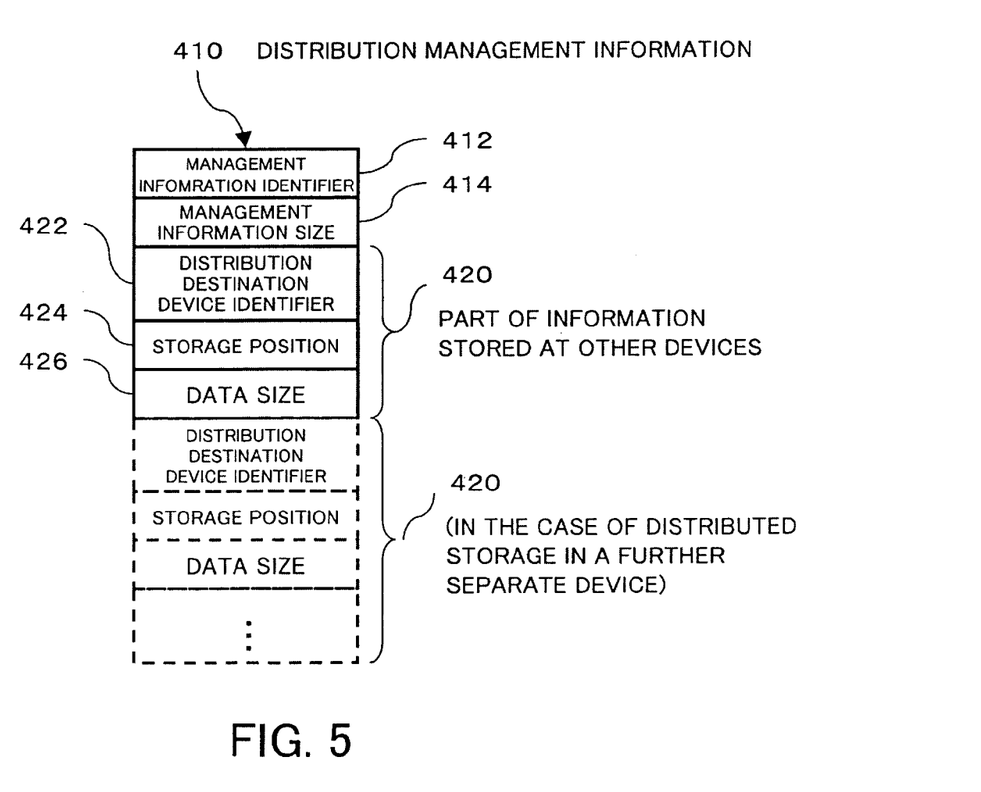
FIG. 5 is a view showing an example data configuration for distribution management information within the stored file.

An example of a data structure for the distribution management information 410 is shown in FIG. 5. In this example, the distribution management information 410 first starts from an identifier 412 for the management information itself, the size 414 of the management information itself is then described, with information 420 for accessing data stored in the device (in this embodiment, the RAM 14) to which the job data is distributed. The information 420 includes a distribution destination device identifier 422, a storage position 424 within this device for data stored in a distributed manner at this distribution destination device, and a data size 426 for this data. When the distribution destination device is the RAM 14, a start address of a data storage area for the data in the RAM 14 can be used as the storage position 424.

In the example in FIG. 1, job data is distributed between the HDD 16 and the RAM 14. However, there are cases where the image-forming device is equipped with storage devices other than the HDD 16 and the RAM 14. For example, there are cases where the image-forming device is provided with a plurality of HDDs or is provided with EEPROM or non-volatile memory. In such cases, the job data can be stored in a distributed manner across a plurality of storage devices. The identifier 422 for the distribution destination device is an identifier for identifying this plurality of storage devices. When the job data is stored in a distributed manner at a plurality of storage devices other than the HDD 16, the information 420 is described for each storage device at the distribution management information 410. In this case, the order of the information 420 of the distribution management information 410 corresponds with the order of the job data stored in a distributed manner.

Figure 6:
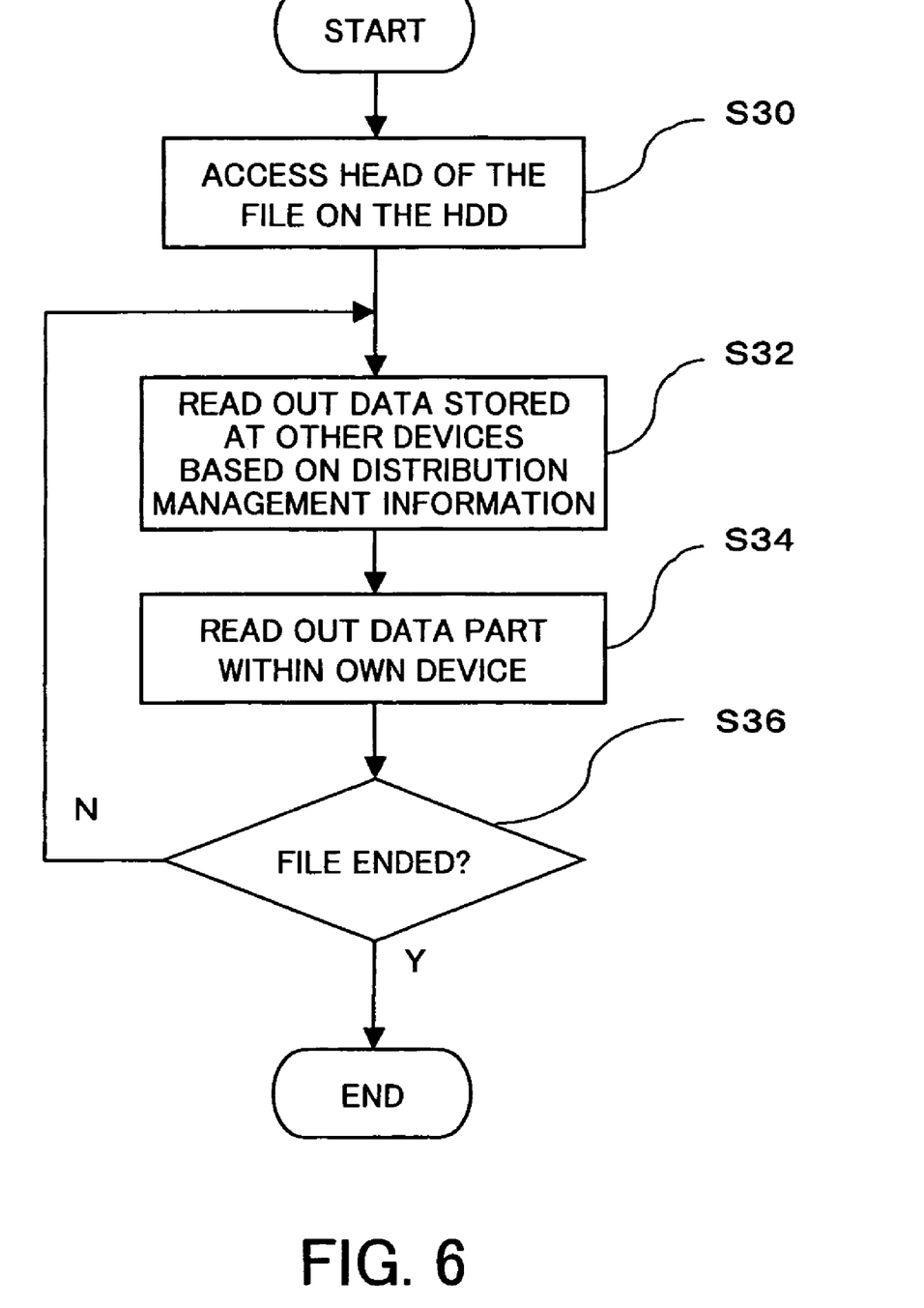
FIG. 6 is a flowchart showing an example of a procedure for reading a job data file stored in a distributed manner.

A description is now given with reference to FIG. 6 of processing at the storage/deletion controller 110 when reading out job data stored in a distributed manner.

When reading of job data file from the job controller 100 is requested, the storage/deletion controller 110 first accesses the head of the file in the HDD 16 (S30), reads the distribution management information 410, and reads data stored in a distributed manner at the RAM 14 in accordance with information for the storage device identifier 422, the storage position 424 and the data size 426 indicated in the distribution management information 410 (S32). When a plurality of storage devices are destinations for distributed storage, the data is read from each storage device in the order of the information 420 in the distribution management information 410 and combined. When reading of the data from all of the storage devices that are distributed storage destinations is finished, the data part 450 stored directly after the distribution management information 410 is read, and is combined at the back of data read from the distributed destinations (S34). Reading of job data is then completed by repeating this process (S36) until the end of the stored file 40 is reached. The job data read out is encrypted and the storage/deletion controller 110 therefore decrypts this job data using the encryption module 112 and provides decrypted job data to the job controller 100.

Figure 7:
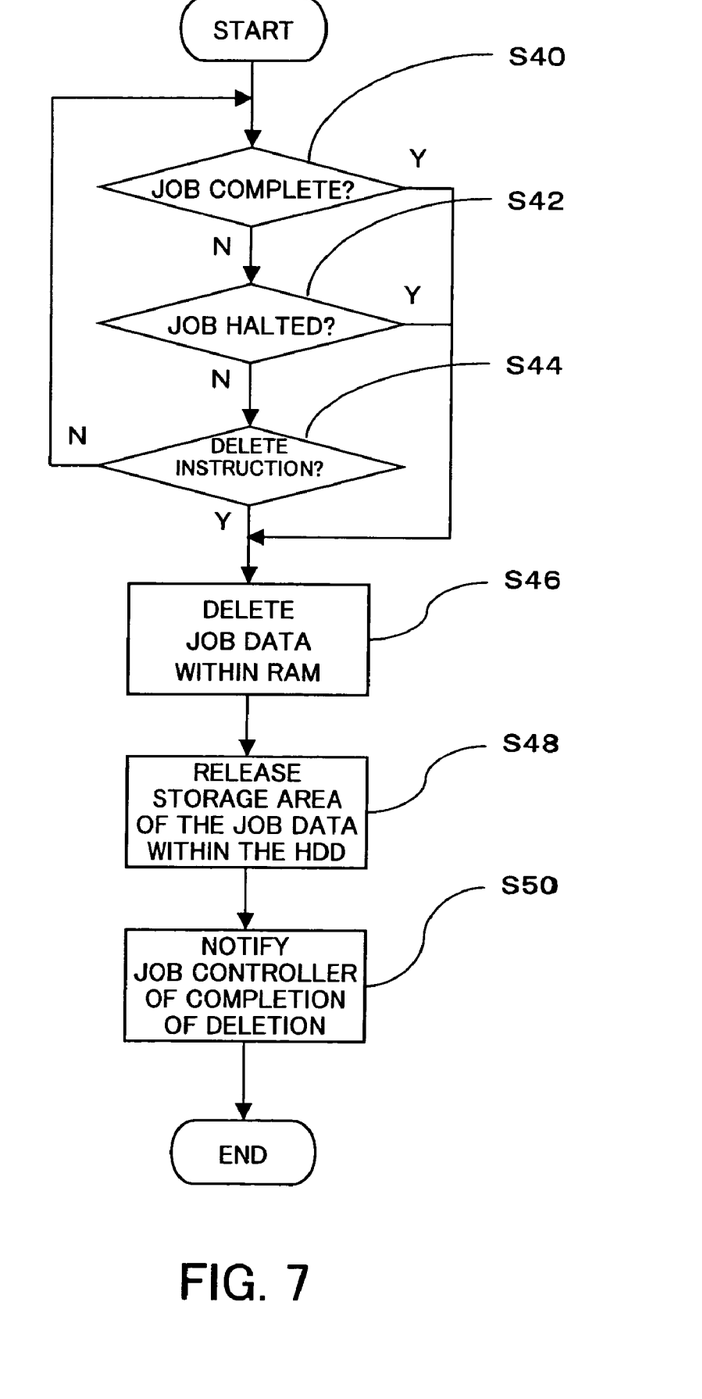
FIG. 7 is a flowchart showing an example of a procedure for job data file deletion processing.

Next, a description is given with reference to FIG. 7 of a process for deleting a job data file stored in a distributed manner at the HDD 16 and the RAM 14.

This deletion process is executed when prescribed deletion conditions are fulfilled with respect to the job data file. Completion of execution of a job using the job data file can be given as a typical deletion condition. The input by a user of an instruction to stop a job using a job data file is another example of a deletion condition. Further, an explicit instruction by a user to delete a specified job data file is another example of a deletion condition.

The storage/deletion controller 110 monitors for notification of job execution completion from the job controller 100 and user input from the operation panel 18, and waits to see if any of these deletion conditions is satisfied (S40, S42, S44). If any one of these deletion conditions is satisfied, the part 42 stored in the RAM 14 for the job data file for which a condition is satisfied is deleted (S46). Specifying of the portion to be deleted can be achieved by, for example, reading the distribution management information 410 in the stored file. This is data in RAM and can therefore be deleted quickly and completely. Next, the file 40 stored for the job data in the HDD 16 is deleted and the area for the stored file is freed (S48). This deletion process may also be a process for deleting file management information on the file system such as an MS-DOS (trademark) DEL command or a UNIX (registered trademark) rm command file deletion. In this case, actual data remains for the stored file 40 after deletion (until overwritten) but it is not possible to completely decrypt the original job data file with just the remaining actual data. Further, in this embodiment, the job data file is encrypted and then stored in a distributed manner on the HDD and RAM and it is therefore extremely difficult to perform decryption with just the actual data remaining on the HDD.

When deletion (S48) of the stored file is complete, the storage/deletion controller 110 gives notification (S50) of the fact that processing to delete the requested data is complete to the job controller 100. The job controller 100 receiving this notification permits execution of the following job. In this way, if, for example, there is a job (new job, job interrupted by another job, etc.) at the time of deletion, execution of this job is started or re-started.

In this way, according to this embodiment, by deleting data stored in a distributed manner at the RAM 14, the job data saved at the HDD 16 is made substantially invalid. This enables deletion of data at a substantially higher speed when compared to the case of the related art where data is randomly written any number of times over job data saved in its entirety on the HDD. Therefore, in cases such as when returning from an interrupt job or when a subsequent job is waiting, it is possible to delete data without the waiting job having to wait much at all. It is therefore not necessary for the deletion of job data to be postponed until completion of the following job.

Further, in this embodiment, RAM 14 that is volatile memory is used as the distributed storage destination for the job data. If power to the image-forming device is then turned off, the distributed data is erased, and the same results as for the aforementioned deletion processing are obtained.

One example that is appropriate is to delete data by repeatedly writing data in a random manner on the actual data for the stored files remaining on the HDD 16 at appropriate times after deleting the data in the RAM 14 as described above. It is appropriate to carry out processing to delete by randomly overwriting data at times when the influence to jobs is small, such as after a prescribed period of time for when the image-forming device has not been used, directly before going to a power-saving mode, or when the power switch is turned off. In this embodiment, the job data can be saved more safely than in the related arts from finishing the job to deleting data by overwriting randomly with data.

In the embodiment described above, the size of the data stored in a distributed manner in the RAM 14 is decided in accordance with the amount of space in the RAM and a random number, but this is given merely as an example. It would also be possible to take the size of the storage in the RAM 14 as a fixed value or decide this in a completely random manner without taking into consideration the amount of space.

Figure 8:
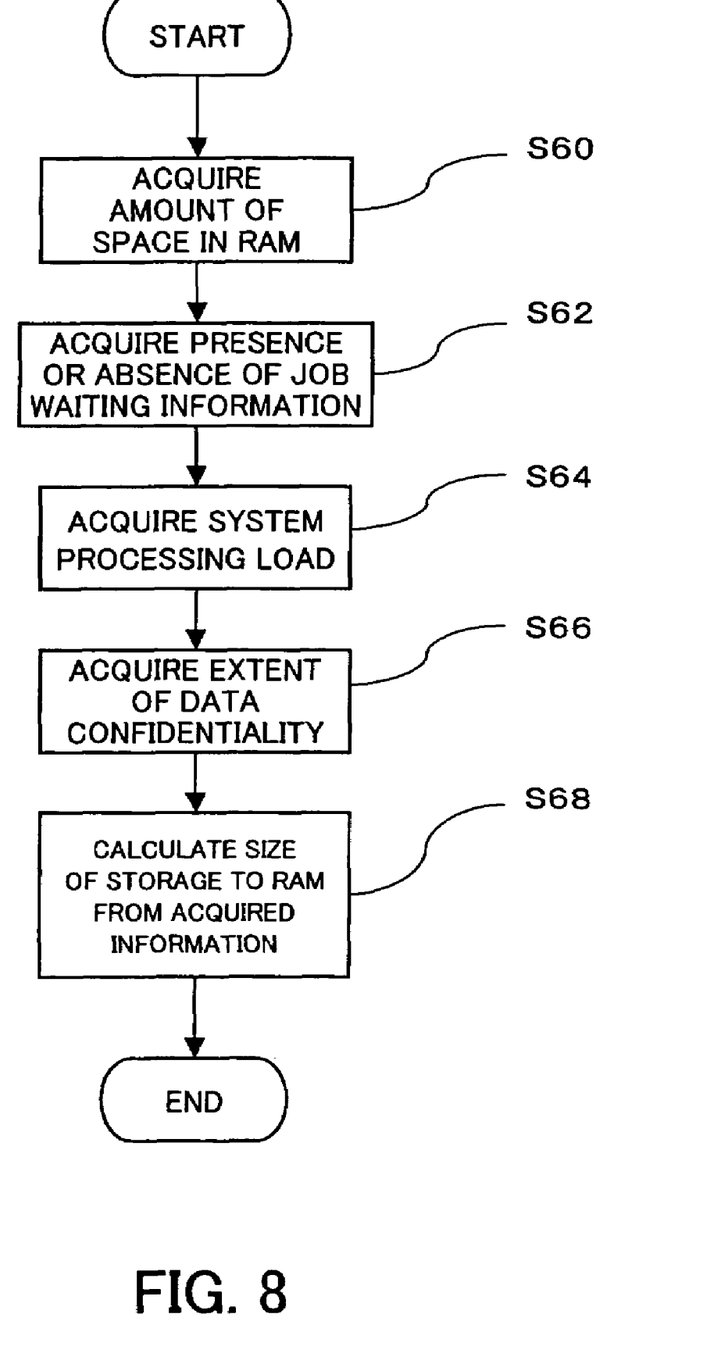
FIG. 8 is a flowchart showing an example of a procedure for determining a volume of data stored in a RAM.

Further, it is also possible to determine storage size taking into consideration conditions other than the space in the RAM. This example is shown in FIG. 8. In this example, in addition to acquiring the amount of space left in RAM (S60), information such as whether or not there is a job waiting (S62), overall processing load on the image-forming device (S64), and level of job data confidentiality (S66) is also acquired, with size for storing to the RAM 14 then being determined taking this information as parameters (S68).

First, when a job is waiting, or when the processing load on the image processing device is high, the deletion of data by writing data randomly at the HDD 16 will become slow to this extent, and the amount of data allocated to the RAM 14 is therefore increased in order to increase safety of the job data for the period of time up to the deletion. In this way, it is possible to make a larger amount of data disappear by deleting data within the RAM after job completion and the possibility of restoring job data is further reduced.

Information as to whether a job is waiting can be acquired from the job controller 100 and the processing load for the whole of the image processing device can be acquired from the job control device 100 or the operating system.

Further, when the degree of confidentiality for the job data is high, deleting as large a portion of this data as possible when the data is no longer necessary is effective from a security point of view. The amount of data allocated to the RAM 14 is therefore larger for a higher degree of confidentiality.

Degree of confidentiality of job data can be instructed by the user as one of the job attributes or can be determined from the job content. In the latter example, in the case of, for example, a security print, where high security is assumed, the degree of confidentiality of the job data is made high. It is also possible to register the degree of confidentiality of each job in advance at the image-forming device.

Moreover, in cases where there are a plurality of storage devices other than the HDD 16 to which job data is allocated, it is preferable for the amount of data allocated to the plurality of storage devices to be decided according to the speed of writing and reading to these storage devices. The speed of writing and reading to each storage device influences the speed of storing and reading of job data overall, and it is therefore preferable for the amount of data allocated to storage devices that write and read slowly to be small. For example, when data is allocated to an EEPROM in addition to the RAM 14, the speed of writing and reading to and from the EEPROM is slow compared to the RAM 14 and the HDD 16, and the amount of data allocated to the EEPROM is made smaller than the amount of data allocated to RAM.

Control of allocation according to content of the job data can also be considered. For example, job data is formed from a header section and a data section (body section). Control can therefore be considered where characteristics of the data are largely included in the header section, and a large amount of data for the header section is allocated to the RAM 14, while data for the body section is more commonly allocated to the HDD 16.

Further, in the above, the job data is distributed and stored after being encrypted at the encryption module 112. However, the distributed storage method of the present invention is still effective to a certain extent even when this kind of encryption is not carried out. Even without encryption, part of the job data is deleted as a result of deleting data within the RAM 14. This means that even if the HDD 16 is extracted, there is no possibility of complete job data being leaked.

When encryption of the job data is not carried out at the image-forming device, it is preferable to change the rate of allocation of data between the RAM 14 and the HDD 16 depending on whether the job itself is encrypted (for example, when print data itself from the host is encrypted) or not. Namely, when job data is encrypted, the proportion of data allocated to the RAM is made high so that as much information as possible is deleted from the job data as a result of deleting data within the RAM.

A method of allotting tag information (either one or both of a start tag and an end tag) mainly to RAM can also be considered as a method for distributing data between the RAM and HDD in the case of distributed storage where job data is structured documents where job data is provided with tags. In this method, it is possible to erase information regarding document structure by erasing data within the RAM. Further, a method is also appropriate where characteristic portions corresponding to the type of job data are allotted to RAM, so that when the job data is a business document, numeric information within a document is allotted to RAM with priority, and in the case of name list data, character strings corresponding to personal names are allotted with priority to RAM. The type of document can be obtained from attribute information for the job data file, etc.

In the above example, job data is allotted alternately to the RAM 14 and the HDD 16. However, in place of this, it is also possible to change the order of allocation between the RAM 14 and HDD 16 in a random manner. In this case, information for the order of the data stored in each distribution storage destination is included in the distribution management information 410.

In the above example, the distribution management information 410 is stored in the HDD 16 but this is not essential. Management information describing distribution conditions for job data with regards to each storage unit such as the distribution management information 410 may also be stored in the RAM 14 or storage devices within other image-forming devices.

Figure 9:
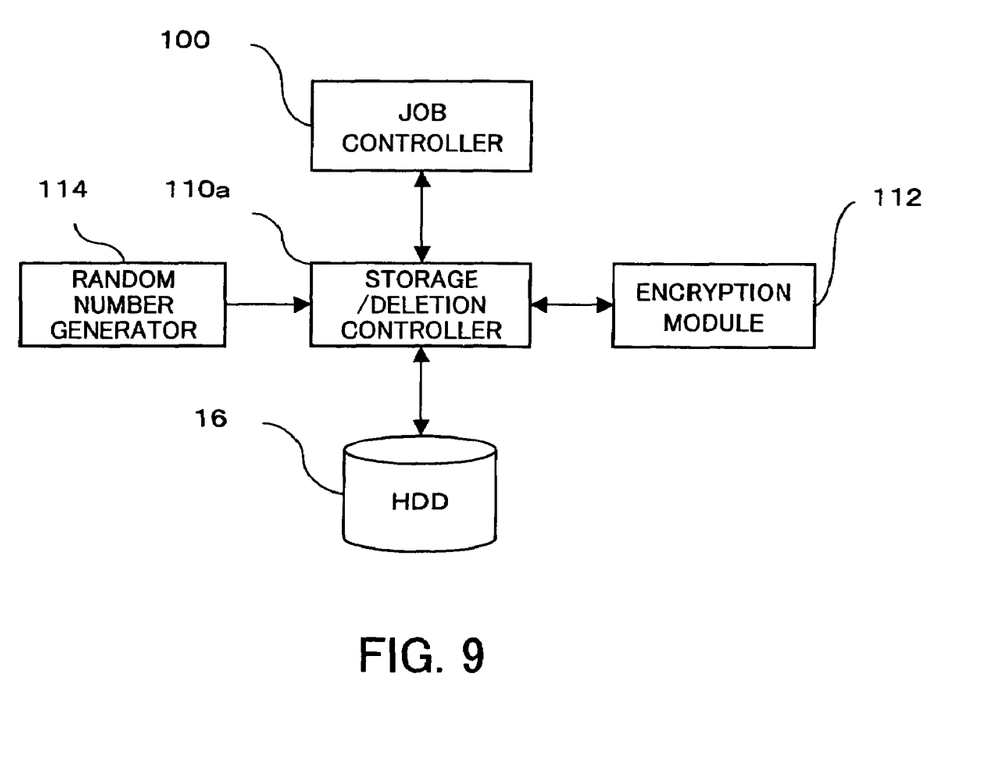
FIG. 9 is a view showing a modified example of a device for storing and deleting job data.

A device structure that does not utilize the RAM 14 can also be considered as a modified example of this embodiment. This example is shown in FIG. 9. In FIG. 9, structural elements that are the same as or analogous to structural elements shown in FIG. 2 are given the same numerals and description thereof is omitted.

In this example, a storage/deletion controller 110a just stores job data in the HDD 16 as in the related art after the job data is encrypted by the encryption module 112.

Figure 10:
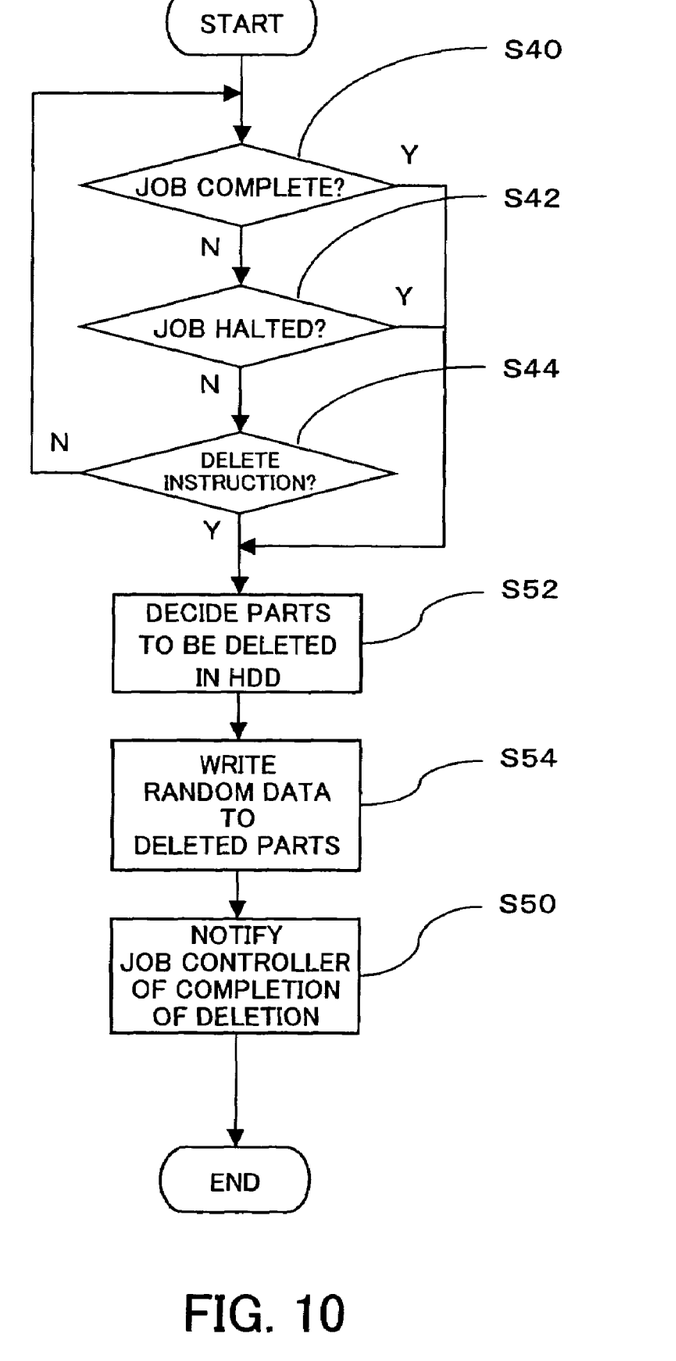
FIG. 10 is a flowchart showing an example of a procedure for job data file deletion processing occurring in a modified example.

A feature of this modification is in processing for deleting the job data. Namely, as shown in FIG. 10, when the job data deletion conditions are fulfilled (S40 to S44), the storage/deletion controller 110a decides upon locations of the job data within the HDD 16 to be deleted using one or more random numbers generated by the random number generator 114 (S52). The position and size of the data to be deleted can be decided for a plurality of deletion locations using one to a plurality of generated random numbers. The storage/deletion controller 110a then repeatedly overwrites the deleted locations decided upon in this manner a prescribed number of times with random data (S54). When this overwriting deletion is completed, the storage/deletion controller 110a then deletes the job data file from the file system and notifies the job controller 100 that deletion of the data is complete (S50). As a result, it is then possible to execute the next job and if there is a job waiting or a job that was interrupted by an interrupt etc. then such a job can also be executed. After this deletion, the deletion processing can be made still more secure if deletion processing is carried out by repeatedly writing random data on the job data portions remaining in the HDD 16 during time when the image-forming device is idle, etc.

According to this embodiment, job data remaining on the HDD 16 when data of the job data stored in the HDD 16 has been erased from a plurality of locations is not complete job data, and even if the remaining data is extracted, the risk of a security leak is small.

In this example, a plurality of portions of encrypted job data are erased and it is extremely difficult to decrypt the remaining data.

Further, if the ratio of the size of these erased locations with respect to the overall job data is made small, the time required for the deletion processing is small and deletion processing can be executed without jobs that are waiting having to wait very long.

The above is a description of a preferred embodiment for the case of application of the present invention to an image-forming device such as digital multi-purpose equipment, etc. However, as is clear from the above description, the method for protecting stored data in this embodiment does not depend on the type of processing or the type of data to be stored and application to various job processing devices other than image-forming devices is possible.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims should cover any and all such applications, modifications, and embodiments within the scope of the present invention.

What is claimed is:

1. A job processing device for executing jobs based on job data, comprising:
    a first storage device;
    a second storage device capable of having stored data erased at a faster speed than the first storage device;
    a storage controller for dividing a job data file supplied for executing a job into a plurality of parts, and distributing the plurality of parts between the first and second storage devices, based on available space in the second storage device, wherein data corresponding to one or more of the plurality of parts stored on the second storage device are not stored on the first storage device;
    a deletion controller for deleting the one or more parts of the job data file stored on the second storage device, by the storage controller, when a prescribed deletion condition is satisfied; and
    a job controller for executing a following job without waiting for completion of deletion of parts of the job data file stored in the first storage device when the one or more parts of the job data file stored in the second storage device are deleted by the deletion controller.

2. The job processing device of claim 1, further comprising:
    a job data reconstructor for reading out and reconstructing job data files being distributed between the first and second storage devices by the storage controller; and
    a job processing unit for executing jobs based on job data reconstructed by the job data reconstructor, wherein completion of job execution by the job processing unit is taken as the prescribed deletion condition in the deletion controller.

3. The job processing device of claim 1, wherein the second storage device is volatile memory.

4. The job processing device of claim 1, wherein the second storage device is an area that is part of a main storage device the job processing device is equipped with.

5. The job processing device of claim 1, wherein the storage controller encrypts the job data and distributes data resulting from this encryption between the first storage device and the second storage device.

6. The job processing device of claim 1, wherein
    the storage controller distributes job data between the first storage device and the second storage device in accordance with a prescribed rule; and
    the job processing device is further equipped with a rule manager for changing the prescribed rule.

7. The job processing device of claim 6, wherein the rule manager changes the prescribed rule according to the state of the job processing device.

8. The job processing device of claim 6, wherein the rule manager changes the prescribed rule according to an attribute of the job.

9. The job processing device of claim 1, further comprising a remaining data deletion controller for deleting job data distributed to the first storage device after deleting job data distributed to the second storage device.

10. The job processing device of claim 1, wherein the prescribed deletion condition for the deletion controller is receipt of a job data deletion instruction from a user.

11. The job processing device of claim 1, wherein the prescribed deletion condition for the deletion controller is receipt of a halt job execution instruction from a user.

12. The job processing device of claim 1, wherein the job controller executes the next job at the time of completion of deletion of the one or more parts of the job data file stored on the second storage device by the deletion controller.

13. A data management method for a job processing device, comprising the steps of:
    distributing job data supplied for executing a job between a first storage device and a second storage device capable of deleting data at a higher speed than the first storage device;
    deleting one or more parts of the stored job data that is stored in the second storage device when a prescribed deletion condition is satisfied; and
    executing a following job without waiting for completion of deletion of parts of the job data stored in the first storage device when the one or more parts of the job data stored in the second storage device is deleted.

* * * * *